United States Patent [19]

Trask et al.

[11] 3,834,182

[45] Sept. 10, 1974

[54] FLOATING RING COUPLER

[75] Inventors: Walter H. Trask, Pasco; Jack Dixon, Kennewick, both of Wash.

[73] Assignee: Riggers Manufacturing Company, Kennewick, Wash.

[22] Filed: Jan. 22, 1973

[21] Appl. No.: 325,954

[52] U.S. Cl. .......................... 64/9 R, 64/6, 64/11 R, 64/31
[51] Int. Cl. .............................................. F16d 3/18
[58] Field of Search ............ 64/9 R, 6 R, 31, 14, 13, 64/10, 16, 11 R; 74/411

[56] References Cited
UNITED STATES PATENTS

| | | | |
|---|---|---|---|
| 1,607,362 | 11/1926 | Powers | 64/11 R |
| 1,916,391 | 7/1933 | Shamberger | 64/31 |
| 2,659,217 | 11/1953 | Talbot | 64/9 R |
| 3,132,494 | 5/1964 | Hoffer | 64/9 |
| 3,217,517 | 11/1965 | Wamery | 64/31 |
| 3,698,208 | 10/1972 | Williams | 64/31 |

Primary Examiner—Samuel Scott
Assistant Examiner—Randall Heald
Attorney, Agent, or Firm—Wells, St. John & Roberts

[57] ABSTRACT

A flexible coupler for connecting nominally coaxial shafts drivingly connected to one another, permitting a limited amount of angular and radial misalignment between the shafts to be accommodated in the coupler. The coupler comprises three basic elements. First in an enlarged cylindrical hub fixed to one shaft. Second is a smaller cylindrical flange fixed to the other shaft in juxtaposition to the hub. Third is a "floating" annular ring also juxtaposed with the hub about the flange. Loose fitting complementary axial lugs and notches interconnect the hub and ring. Loose fitting complementary radial lugs and notches are interfitted between the ring and flange. the flange and ring are located relative to the hub for axial clearance, permitting limited angular misalignment between the two shafts. The flange and circumjacent coupler ring form a planar surface juxtaposed with the inner planar surface of the hub to form a longitudinally compact and rugged flexible drive coupler.

3 Claims, 5 Drawing Figures

PATENTED SEP 10 1974　　3,834,182
FIG 1
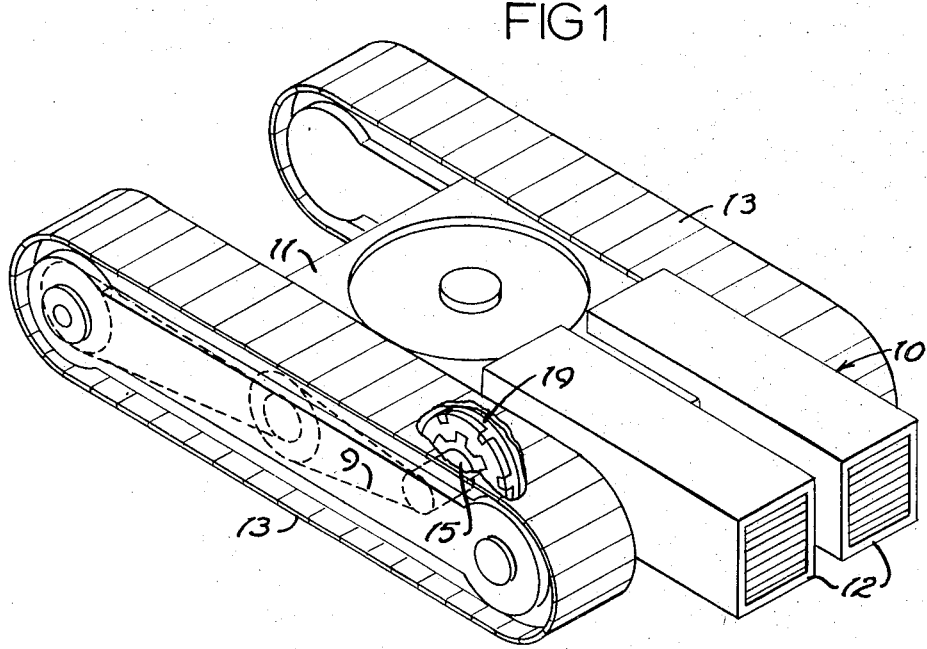
FIG 2
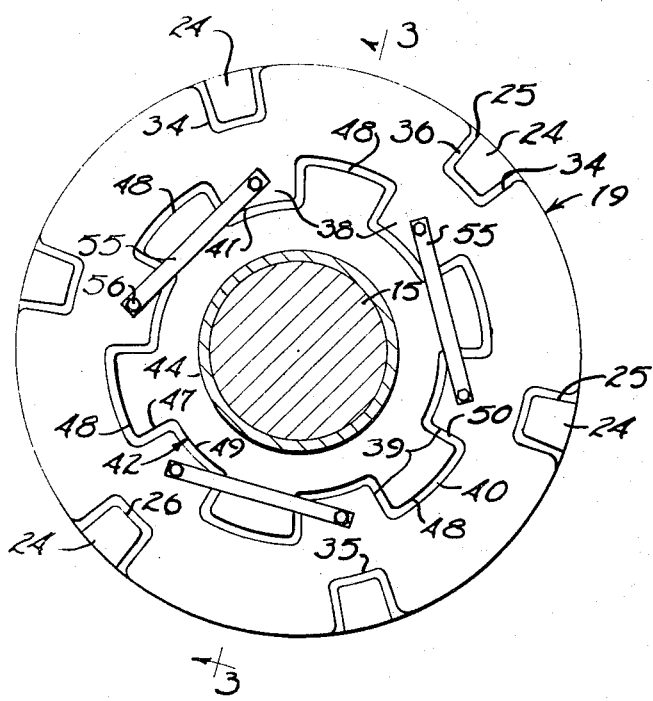
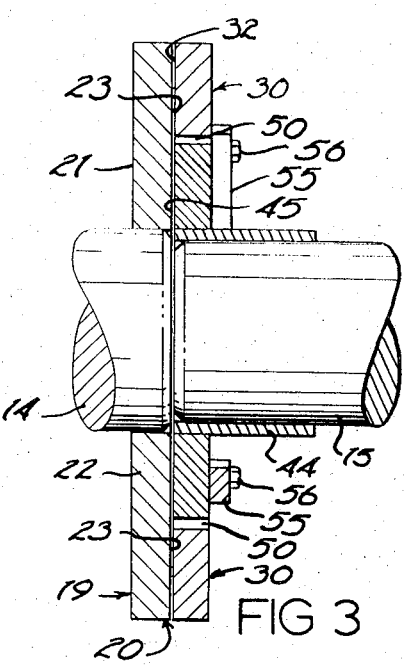
FIG 3

FLOATING RING COUPLER

BACKGROUND OF THE INVENTION

This invention relates to flexible couplings for aligned shafts subjected to extremely high torque loading at relatively low rotational speeds. It was designed specifically for use in the construction field in the drive connections for heavy duty vehicles.

Pertinent prior developments in the field of flexible couplings include the conventional Oldham coupling, and other conventional couplings including axially extending slide members. Such couplings cannot be used where axial space limitations present prevent one from developing lug or slide members of sufficient strength to withstand extreme high torque loads. Flexible lugs or members cannot withstand heavy torque loads of the magnitude encountered in construction vehicles.

Prior U.S. Pats. No. 1,607,362 to Powers, gives an example of axial couplings. The lugs shown in this patent extend axially in both directions and the coupling requires substantial axial space for its inclusion between the aligned shafts. According to the present disclosure, the required axial space is approximately half that indicated by this prior disclosure.

McDowell U.S. Pat. No. 3,298,240 discloses a floating pinion for reduction gears. A related radially toothed flexible coupling is shown in the Tyler U.S. Pat. No. 2,310,329. These patents do not disclose means for permitting angular misalignment, nor do they have the capability for withstanding the loads anticipated by the disclosure herein.

U.S. Pat. Nos. 2,614,642, 2,352,086 and 2,707,522 are believed to be representative of the prior art patents disclosing planetary hub final drives for crawler type vehicles of the type generally discussed herein.

The specific problem encountered by the present invention is the necessity of providing a flexible connection between the drive shaft from an engine located on a vehicle frame and the nominally coaxial driven shaft of an adjacent crawler track assembly. It is most difficult to exactly align these two shafts, which are normally located on independent frames fastened to one another. Furthermore, all such structures are subjected to deflections during use, which cause instantaneous misalignment at any given moment. It is essential that some type of flexible coupling be used to protect the shaft bearings from damage due to the resulting radial loading that stems from such misalignment.

A further problem encountered in the drive connections between a vehicle and adjacent crawler track assemblies is the limited axial space along the shafts available for inclusion of a flexible coupling or for repair or assembly purposes. The present apparatus provides a two-thickness coupling which permits both radial and angular misalignment to a limited degree. The interposed "floating" annular ring balances resulting radial loads. It can be designed to provide the maximum available moment arm about the shaft axes, assuring successful operation in extreme high torque load situations.

SUMMARY OF THE INVENTION

The present flexible coupling is adapted for use between aligned shafts that are nominally coaxial. A cylindrical hub fixed coaxially to one shaft has a plane inner face perpendicular to its axis. A smaller cylindrical flange fixed to the other shaft presents a plane inner face perpendicular to its axis also and located in juxtaposition with the inner face of the hub. An annular ring circumjacent to the flange is located about the hub for limited axial movement and also has an inner face that is in juxtaposition with the inner face of the hub. A first set of complementary interfitting lugs and notches is interconnected axially between the hub and ring. The second set of complementary interfitting lugs and notches is interconnected radially between the flange and ring. The respective pairs of lugs and notches are loosely fitted to accommodate compensating movement of the ring during rotation caused by limited radial and angular misalignment which might occur between the respective axes of the hub and flange.

It is a first object of this invention to provide a relatively narrow flexible coupling in a dimension along the shaft axis between a driving shaft and a driven shaft. The present coupling requires only two thicknesses of driving elements having sufficient strength to transmit the loads required through the coupling.

Another object of this invention is to provide a flexible coupling that utilizes the maximum available radial torque arm within the physical limitations of the machinery in which it is located.

Another object is to provide a coupling which can be disassembled by simply moving one shaft outward from the other, without requiring attachment or release of any elements, which would otherwise be most difficult in the limited space usually available in such installations.

Another object is to utilize a compensating annular ring between coaxial misaligned elements in such fashion as to balance or reduce imbalance in radial loading caused by shaft misalignment. Another object of this invention is to provide a flexible coupling that can be used without enclosure and which is capable of transmitting high torque loads at relatively low rotational speeds Another object is to provide a flexible coupling that is capable of accommodating limited angular misalignment of nominally coaxial shaft axes as well as radial misalignment.

These and further objects will be evident from the following disclosure, taken also in conjunction with the accompanying drawings, which illustrate a preferred form of the invention.

DESCRIPTION OF THE DRAWINGS

FIG. 1 is an isometric view of a heavy transporting vehicle illustrating the general location of the coupling;

FIG. 2 is an elevational view of a coupling in an inoperative position;

FIG. 3 is an elevational section taken along line 3—3 in FIG. 2;

DESCRIPTION OF A PREFERRED EMBODIMENT

Figure 4:
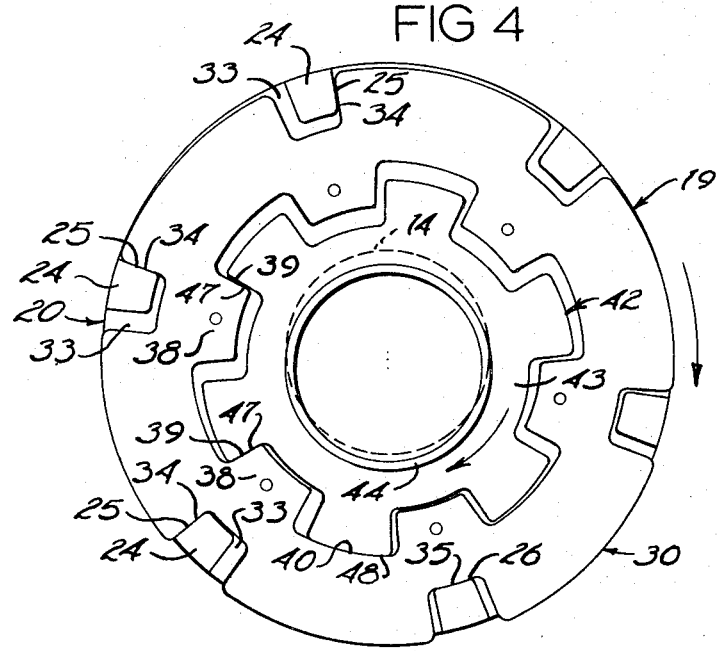
FIG. 4 is a view similar to FIG. 2, only showing the coupling in an operative position.

Referring now to the drawings in greater detail, there is generally shown in FIG. 1 a heavy transport vehicle indicated by reference numeral 10. Vehicle 10 is of the type utilized in construction for transporting unusually heavy loads, often weighing thousands of tons. The vehicle illustrated basically comprises a vehicle frame 11 supporting a power source 12 shown as a pair of internal combustion engines and operatively connected ground engaging tracks 13. It should be noted that the vehicle 10 illustrated is merely exemplary of a single use of the present invention and that its use is not intended to be restricted exclusively to such vehicles.

Figure 5:
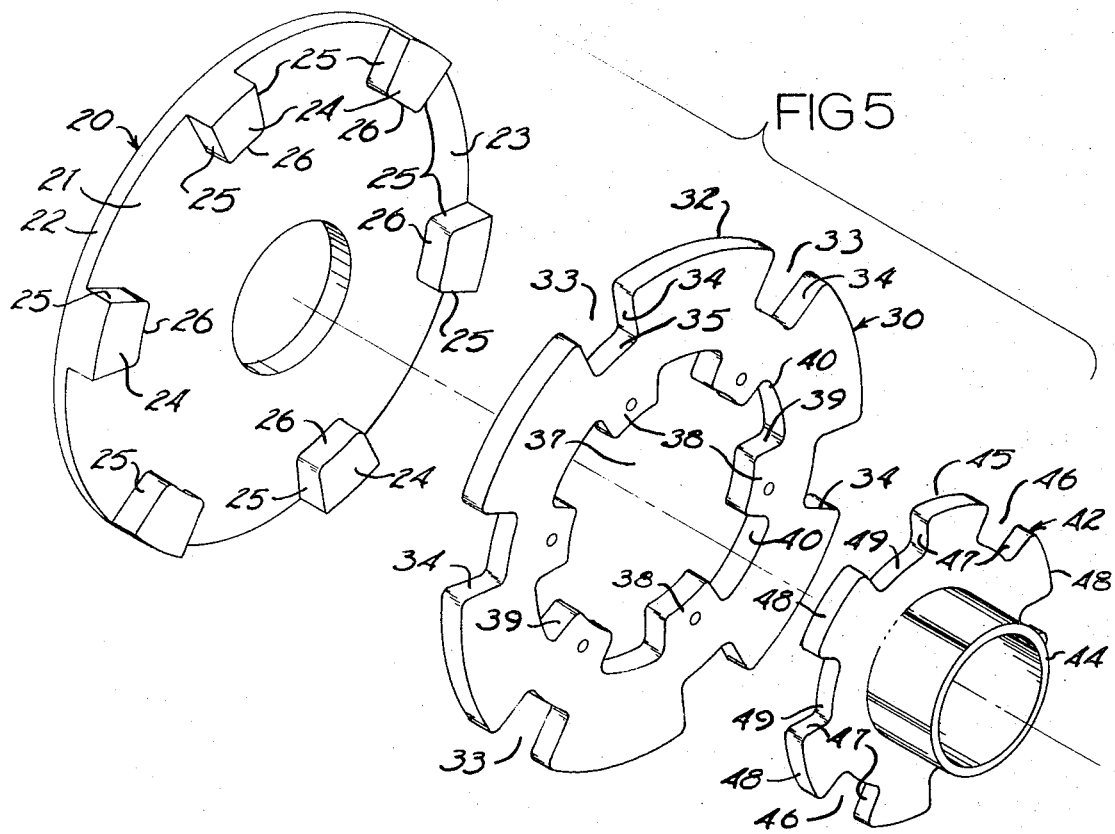
FIG. 5 is an exploded, isometric view showing the three basic members of the coupling individually.

The flexible coupling, designated by the numeral 19 is illustrated in FIGS. 1 and 3 connecting a drive shaft 14 of an engine 12 to a nominally coaxial output or driven shaft 15 which is operatively connected to tracks 13 by an outer chain drive mechanism 9. The elements comprising the coupling may best be seen with reference to FIGS. 2 and 5. Basically, these elements include a drive member 20, an annular, "floating" coupling ring 30 and an output or drive member 42. Torque from drive shaft 14 is transferred from drive member 20 to the intermediate ring 30 and finally to the driven member 42 and shaft 15.

Drive member 20 comprises a cylindrical hub 21 fixed coaxially to drive shaft 14. Plate 22 includes a planar inner face 23 that is perpendicular to the axis of shaft 14. A plurality of angularly spaced axial drive lugs 24 extend axially inward from plate face 23. Lugs 24 each include opposed flat radial drive surfaces 25 extending inward from the plate periphery to arcuate inwardly facing surfaces 26. Surfaces 26 are formed about a common radius from the central axis of plate 22.

Coupling ring 30 (FIGS. 2 and 5) is constructed from a circular plate of a thickness substantially equal to the distance lugs 24 protrude from the face 23 of plate 22. As shown in the drawings, ring 30 includes a planar inner surface 32 which in the assembled coupling (FIG. 3) is positioned directly adjacent face 23 of plate 22. In this position, lugs 24 loosely fit within complementary notches 33 formed in the periphery of ring 30. Each notch 33 includes an opposed pair of radial drive surfaces 34 extending from the ring periphery inwardly to an arcuate surface 35. Surfaces 35 are formed about a common radius from the central axis of the ring. It may be noted that the width of each notch 33 is slightly greater than that of the complementary lugs 24 on plate 22. It also may be noted (FIG. 2) that the radius to surfaces 35 on ring 30 is somewhat less than the radius to surfaces 26 of lugs 24. Thus, when assembled, a gap 36 is created between each lug 24 and complementary notch 33. Gaps 36 accommodate a predetermined amount of shaft misalignment as shown in FIG. 4, which will be described in greater detail below.

Ring 30 includes a central aperture 37 having a plurality of angularly spaced radial lugs 38 aligned with and spaced radially inward from notches 33. Lugs 38 are defined by opposed drive surfaces 39 extending radially from outer arcuate surfaces 40 which are formed along a common radius less than the radius forming surfaces 35. Drive surfaces 39 terminate at inward arcuate surfaces 41, also formed along a common radius from the center of the ring. Notches are defined, between lugs 38, by drive surfaces 39 and interconnecting surfaces 40.

The configuration of aperture 37 is complementary to the periphery of the driven member 42. Member 42 consists of a flange 43 affixed to a tubular collar 44. Collar 44 provides means for rigidly connecting member 42 to the driven shaft 15. Plate 43 has the same thickness as ring 30 and provides a planar surface 45 which in the assembled coupling 19 is normally coplanar with surface 32 of ring 30. This assures that the thickness of the coupling along the axes of shafts 14, 15 may be held to a minimum.

Flange 43 has a plurality of angularly spaced notches 46 (FIG. 5) about its periphery which are complementary to lugs 38 of ring 30. Notches 46 are defined by opposed radial drive surfaces 47 connected by outer and inner arcuate peripheral surfaces 48 and 49. Surfaces 48 are formed along a common radius from the center of flange 43. This radius, as may be seen in FIG. 2, is somewhat shorter than the radius on ring 30 to surfaces 40. Surfaces 49 are also formed along a common radius which is shorter than the radius on ring 30 to surfaces 41. Additionally, the width of each lug 38 on ring 30 is less than the width of notches 46 in plate 43. These dimensional and angular differences provide for an additional amount of misalignment between the axes of shafts 14 and 15 as illustrated in FIG. 4 by forming an annular gap 50 (FIG. 2) between ring 30 and flange 43.

FIG. 4 illustrates a maximum amount of vertical misalignment between shafts 14 and 15 as allowed by closing gaps 36 and 49 vertically. FIG. 4 also illustrates the relative positions of the coupling members during transfer of torque from shaft 14 to shaft 15.

During operation, with the shaft misalignment shown by FIG. 4, the lugs 24 indicated are moved into contact with the indicated notches 33 of ring 30 so that corresponding drive surfaces 25 and 34 abut. Torque is thereby transferred to ring 30. The surfaces 39 of lugs 38 of ring 30 then move against corresponding drive surfaces 47 of notches 46. This completes a mechanical coupling, directly transferring torque from shaft 14 to shaft 15 while simultaneously allowing for both radial and angular misalignment of the shaft axes within the range defined by gaps 36 and 50.

By spacing the coplanar surfaces 32 and 45 slightly apart from surface 23, a certain degree of angular misalignment between the shafts may also be allowable.

FIGS. 1 and 3 show retainer straps 55 removably mounted to member 30 by means of bolts 56. Straps 55 serve to hold the "floating" ring 30 of the coupling against longitudinal movement away from members 20 and 42. Ring 30 is free to "float" vertically within the coupling, loosely engaging members 21 and 42.

One important feature of this structure is its ease of assembly or disassembly. With members 20 and 42 fixed to shafts 14 and 15 respectively, the coupling is simply broken down by pulling outward on either shaft relative to the other. No bolts or other fasteners are used, to hold the ring 30 in position. To assemble, the coupling, ring 30 can temporarily rest on member 42 and straps 55 to provide support while shafts 14, 15 are moved into working position. This feature permits use of the coupling where physical access to the coupling is limited or impaired.

While shafts 14, 15 are nominally coaxial, assembly of the shafts in bearings on distinct frames such as in a transport vehicle (FIG. 1) makes almost impossible perfect shaft alignment. Furthermore, the normal flexing of the vehicle during use will result in instantaneous variations of the shaft location, both radially and angularly. The "floating" ring 30 mechanically accommodates this variable misalignment and the multiple driving surfaces about ring 30 cooperatively effect a rotationally balanced load on both shafts 14, 15. The floating movement of ring 30 serves to reduce substantially the level of radial loading that results from misalignment. In order to provide for possible angular misalignment, a reasonable clearance must be provided between the surface 23 and surfaces 45 and 32 as can be seen in FIG. 3.

To make most effective use of the coupling ring, it is advisable that the hub 21 be constructed with as large a diameter as is possible within the practical limits of its environment. This permits the lugs 24 to have a relatively large moment arm and thereby minimizes the actual force exerted at the drive side of the coupling assembly.

As an example of the dimensions envisioned for this device, a practical working unit has been constructed with the hub 21 having an outer diameter of 36 inches and flange 43 having an outer diameter of 25½ inches. The three coupler elements were constructed from one and half inch thick heat-treated steel plates. The separation between surface 23 and surfaces 32, 45 was one-fourth to three-eighths inch. The coupler was successfully subjected to rotational speed of 2 rpm. The centered clearance between the lug and notch surfaces as illustrated in FIG. 2 was one-half inch, permitting maximum misalignment of 1 inch in a radial direction. The normal amount of misalignment encountered was of the magnitude of one-fourth to three-eighths inch. The mating surfaces of the coupler were coated with a dry lubricant to minimize friction during relative movement of ring 30.

It should be understood that the above description, taken with the accompanying drawings are exemplary of a preferred form of the invention and that it is conceivable that various changes and modifications could be made without deviating from the intended scope. For example, the lugs 24 could be easily mounted to member 30 to fit within complementary notches in member 20. Therefore, only the following claims are to be taken as definitions of the invention.

What I claim is:

1. A flexible coupling for low-speed, high torque installations between aligned shafts that are nominally coaxial, but wherein limited radial and angular misalignment of the respective axes of the shafts may occur, comprising:
    a cylindrical hub having a central hub axis;
    said hub having a plane inner face perpendicular to said hub axis and extending to a circular periphery formed at a first radius about said hub axis;
    first shaft means fixed coaxially to the hub for rotation therewith;
    a cylindrical flange having a central flange axis normally coaxial with said hub axis;
    said flange having an inner face perpendicular to said flange axis and extending to a circular periphery formed at a second radius about said flange axis, said second radius being less than said first radius;
    said flange and hub being located along said axes with the respective inner faces thereof facing one another in closely adjacent positions;
    second shaft means fixed coaxially to the flange for rotation therewith;
    an annular ring circumjacent to the flange;
    said annular ring having a plane inner face extending between an inner cylindrical surface having a radius slightly greater than said second radius and a coaxial outer cylindrical surface;
    means operatively engageable with the ring for locating said ring about said flange in a substantially coaxial relationship and for permitting limited axial and radial movement of the ring relative to the hub and flange, the inner face of said ring being normally co-planar with the inner face of the flange;
    a set of complementary loosely-interfitting lugs and notches formed axially between the inner face of the hub and the inner face of the ring;
    a set of complementary loosely-interfitting lugs formed radially between the circular periphery of the flange and the inner cylindrical surface of the ring;
    whereby rotational movement of one shaft is transmitted to the other shaft through the flange, ring and hub, the loosely-interfitting lugs and notches, permitting limited radial and angular misalignment between the respective shafts.

2. The coupling as set out in claim 1 wherein the annular ring further comprises an outside circular surface parallel to and axially spaced from its inside circular surface, the lugs and notches loosely interfitting between the hub and ring comprising angularly spaced lugs integral with the hub and projecting beyond the plane inner face of the hub a distance slightly greater than the axial separation between the inner cylindrical surface and outer cylindrical surface of the ring.

3. A flexible coupling for use between a circular hub fixed coaxially to a first shaft and a flange fixed coaxially to a second shaft, said first and second shafts being nominally coaxial and journalled in such manner that misalignment between the hub and flange axes may occur, comprising:
    a first plane hub surface formed across one axial end of the hub;
    a plurality of lugs extending axially outward from the hub beyond said first plane hub surface to a common second plane lug surface, said axial lugs being arranged annularly about the hub axis;
    said flange being encircled by said lugs and having a first plane flange surface facing and closely adjacent to said first plane hub surface and an axially spaced second plane flange surface substantially co-planar with said second plane lug surface;
    a plurality of lugs formed about said flange and extending radially outward from the periphery thereof;
    an annular ring loosely circumjacent to said flange;
    said ring having a first plane ring surface normally co-planar to said first plane flange surface and a second axially-spaced plane ring surface normally co-planar to said second plane flange surface;
    said ring having axial notches formed therethrough along its outside periphery, each notch being in loosely-interfitting engagement by one of said axial lugs;
    said ring also having radial notches formed along its inside periphery, each radial notch being in loosely-interfitting engagement by one of said radial lugs of said flange.

* * * * *